UNITED STATES PATENT OFFICE.

ALBRECHT SCHMIDT AND WILHELM BERTRAM, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

RED-VIOLET VAT DYE AND PROCESS OF MAKING SAME.

No. 867,679.     Specification of Letters Patent.     Patented Oct. 8, 1907.

Application filed January 22, 1907. Serial No. 353,528.

*To all whom it may concern:*

Be it known that we, ALBRECHT SCHMIDT, Ph. D., and WILHELM BERTRAM, Ph. D., chemists, citizens of the Empire of Germany, residing at Höchst-on-the-Main, Germany, have invented certain new and useful Improvements in the Process of Making Red-Violet Vat Dyestuffs, of which the following is a specification.

We have found that on heating dihalogen-thioglycollic-ortho-carboxylic acids with bisulfite solutions at temperatures above 150° C under pressure, vat dyestuffs are formed which dye cotton and wool in a hydrosulfite vat, for instance, red violet tints.

The process may be carried out, for instance, as follows:—

Example I. The dyestuff from dichlorophenylthioglycollic-ortho-carboxylic acid

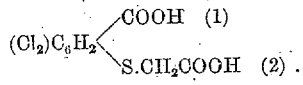

from dichloro-ortho-acettoluidid.

This 3:5 dichlorophenylthioglycollic-ortho-carboxylic acid is obtained according to known methods in the following manner:—The dichloro-ortho-acettoluidid (*Annalen d. Chemie* 274, 291), obtained by the dichlorination of ortho-acettoluidids, is oxidized, for instance, with permanganate to dichloroacetanthranilic acid, the acetyl group is split off by hydrolysis, the resulting dichloroacetanthranilic acid is diazotized and transformed into dichlorothiosalicylic acid or its xanthogen acid ester or trithiocarbonic acid ester and transformed into dichlorophenylthioglycollic-ortho-carboxylic acid by means of chloroacetic acid in alkaline solution. The transformation of this dichlorophenylthioglycollic-ortho-carboxylic acid into the dyestuff is carried out by heating, for instance, 30 parts by weight of the acid in a closed vessel to 170—180° C for about 3 hours, preferably while stirring, with about 250 parts by weight of commercial concentrated sodium bisulfite solution (of about 40 per cent strength). The product of reaction, consisting of a violet black mass is boiled with dilute soda-lye, whereupon the dyestuff remains behind. The dyestuff, when treated with an alkaline hydrosulfite solution becomes dissolved as leuco compound and dyes from this wool and cotton in red violet tints. The dyestuff is a violet black powder, soluble with great difficulty in concentrated sulfuric acid with a green, in hot nitrobenzene with a red violet color, producing on porcelain a violet black metallic stroke.

Example II. A dyestuff may also be obtained, for instance, from dichlorophenylthioglycollic-ortho-carboxylic acid, formed in the aforesaid manner, from dichloroanthranilic acid, obtained by dichlorination of anthranilic acid or acetanthranilic acid in acetic acid. The dyestuff is also a violet black powder and dyes cotton and wool in the vat in red violet tints.

Example III. Dyestuff from dibromophenylthioglycollic-ortho-carboxylic acid. The dibromophenylthioglycollic-ortho-carboxylic acid may be obtained according to the method described in Example I from dibromoacet-ortho-toluidid (*Annalen* 168, 187) or, for instance, from dibromo-anthranilic acid obtained by the dibromination of anthranilic acid or by the dibromination of ortho-nitrotoluene. 3 parts by weight of dibromophenylthioglycollic-ortho-carboxylic acid are heated in a closed vessel to 170—180° C for about 3 hours with about 15 parts by weight of a commercial concentrated sodium bisulfite solution (of about 40 per cent. strength). The violet black crystalline mass is boiled with dilute soda-lye, whereupon the dyestuff remains behind. It dyes in the vat, like the dyestuff from dichlorophenylthioglycollic-ortho-carboxylic acid, cotton a red violet.

Having now described our invention, what we claim is:—

1. The process herein described for making red violet vat dyestuffs, which consists in heating dihalogen-thioglycollic-ortho-carboxylic acids with bisulfites.

2. As new product, the red violet dyestuff, obtained from 3:5 dichloro-phenylthioglycollic-ortho-carboxylic acid, said dyestuff being a violet black powder, very difficultly soluble in concentrated sulfuric acid with a green, in hot nitrobenzene with a red violet color and producing on porcelain a violet black metallic stroke.

In testimony, that we claim the foregoing as our invention, we have signed our names in presence of two subscribing witnesses.

ALBRECHT SCHMIDT.
                WILHELM BERTRAM.

Witnesses:
  JEAN GRUND,
  CARL GRUND.